United States Patent [19]

Wilson

[11] Patent Number: 4,833,917
[45] Date of Patent: May 30, 1989

[54] THREE-COMPONENT VELOCITY PROBE FOR LARGE SCALE APPLICATION

[75] Inventor: Steve M. Wilson, Birmingham, Ala.

[73] Assignee: Southern Company Services, Inc., Birmingham, Ala.

[21] Appl. No.: 229,433

[22] Filed: Aug. 8, 1988

[51] Int. Cl.[4] ............................................. G01P 5/165
[52] U.S. Cl. ...................................... 73/189; 73/182; 73/861.65
[58] Field of Search ............ 73/189, 180, 182, 861.65, 73/861.66, 861.67, 861.68

[56] References Cited

U.S. PATENT DOCUMENTS 4,522,070  6/1985  Hagen ............................... 73/182 X Primary Examiner—Charles A. Ruehl
Attorney, Agent, or Firm—Needle & Rosenberg

[57] ABSTRACT

An improved three-component velocity probe for use in measuring velocity of non-uniform gas flows. Specifically, a new probe geometry enables characterization of a flow in three dimensions in large scale applications. The three-component gas flow velocity probe is a cylinder having three equally spaced sensing ports located on the cylindrical surface in a plane perpendicular to the axis of the cylinder and having two recesses in the cylinder transverse of the length of the cylinder. The recesses are on the opposite sides of the three sensing ports and equally spaced from the sensing ports. The five sensing ports are connected to pressure sensing means remote from the probe to determine the gas flow velocity.

10 Claims, 2 Drawing Sheets

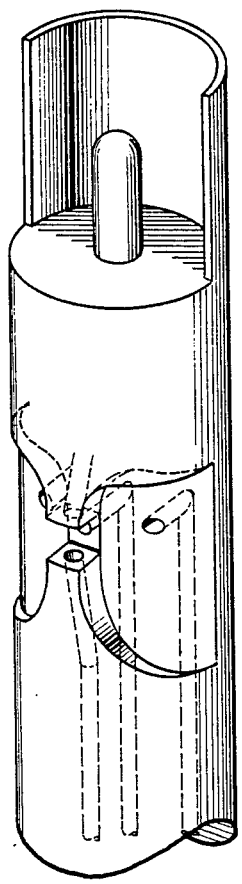
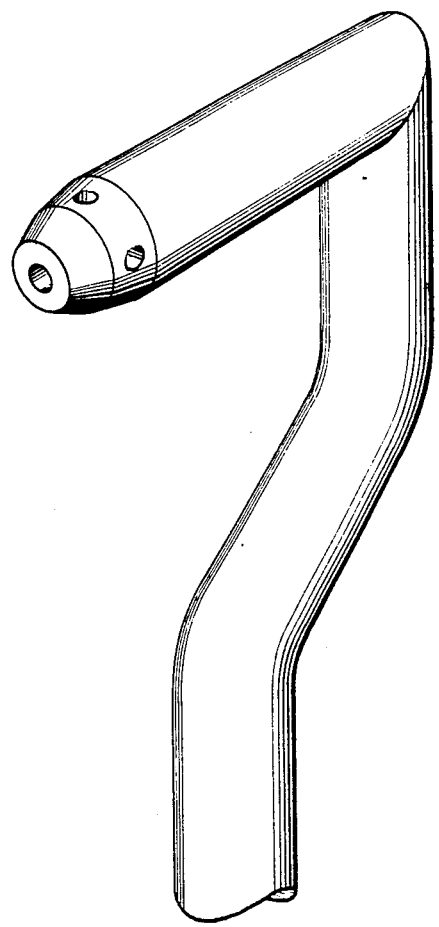
(PRIOR ART)
FIG 1
(PRIOR ART)
FIG 2

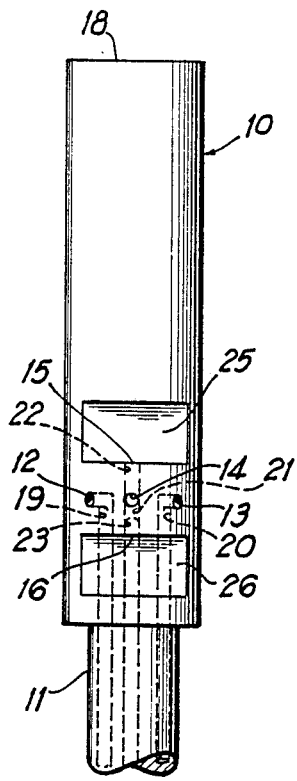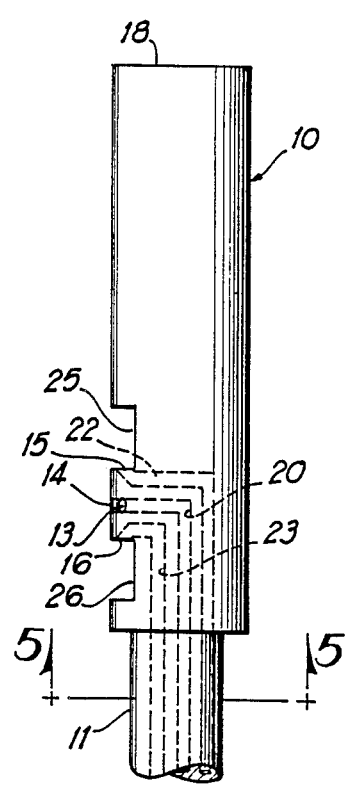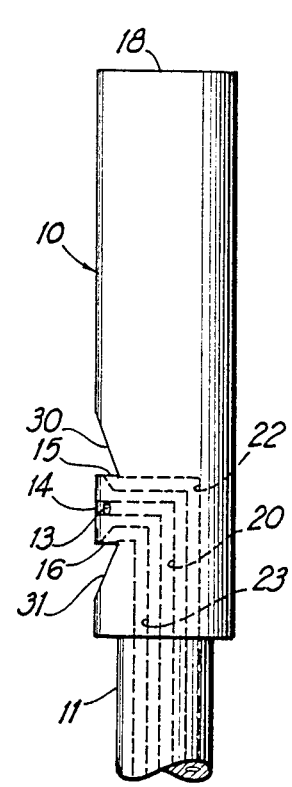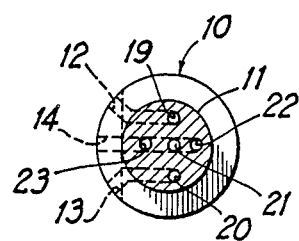

THREE-COMPONENT VELOCITY PROBE FOR LARGE SCALE APPLICATION

BACKGROUND OF THE INVENTION

This invention relates to an improved velocity probe which performs more accurate measurement of the velocity of a non-uniform gas flow. Specifically, a new probe geometry is disclosed which enables characterization of a flow in three dimensions in large scale applications.

The power generation industry has been developing equipment and procedures for accurately determining the non-uniform flow of a gas. Such techniques are required for measuring the as-installed performance of large mechanical draft fans or for accurately determining the pollutant emissions from power plant stacks. Obtaining these measurements has been difficult in the past, because in many instances the flow fields are highly three-dimensional in nature. Because the conditions required for accurate duct flow measurements are often unavailable in most plant installations, it becomes necessary to perform velocity probe traverse measurements close to fans or devices (elbows, turning vanes) that disturb the flow. Using conventional pitot-static probes in these areas can lead to large errors in the integrated results.

The American Society of Mechanical Engineers Performance Test Code 11 (ASME PTC-11) now requires the use of directional probes which are capable of accurately resolving a velocity vector into its three Cartesian components. In addition, federal regulations recently promulgated by the Environmental Protection Agency now require that velocity traverses required for emissions sampling to determine compliance be conducted with directional probes when the measurement is being conducted within two equivalent duct diameters downstream or one-half duct diameter upstream of a flow disturbance.

The majority of three-component velocity probe geometries were developed for testing of the flow characteristics around small scale aeronautical models. Very little if any emphasis has been placed on performance and durability of the various geometries in harsh environments. Small geometry probes positioned in industrial air and gas flows would easily become plugged by particulate and moisture. Simply scaling up these small geometry probes to provide larger holes can render many of the probes useless due to the rigors of large scale testing. Such rigors include snagging of sensing heads on ductwork access ports and abrupt contact of the probe with the duct walls and interior supports. These hazards and the resulting damage can quickly render the calibration of a very accurate probe useless.

A velocity vector can be defined by its magnitude and two angles. In order to simultaneously measure these quantities, a probe with at least five pressure sensing ports is required. Two of these ports are used to produce a differential pressure which is unique to a first angle within the range of calibration. Two additional ports provide a differential pressure that is calibrated to a second angle. These angles are referred to as yaw and pitch. The final port is used to indicate total pressure. Local static pressure is determined by calibrating the output of one or more of the yaw and pitch sensing ports to the known static pressure.

There are generally two classes of probes used for characterizing three-dimensional flows. Single purpose probes are those in which total pressure, static pressure, and direction of flow are determined by separate devices. For this class of probes, access to the flow is required in two orthogonal planes and four separate measurements are required. Use of this class of probes is not considered to be appropriate for large scale flow work since both access and time are usually limited. The second class of probes consists of the combination probes which combine all the functions of the single purpose probes into one geometry. Combination probes are generally larger and much simpler to use.

Operation of combination probes can take three forms. A first procedure consists of holding the probe head stationary in the flow, thereby holding the sensing head pointed along a line parallel to the assumed direction of flow. Neither vector angle is nulled or balanced, which requires that the probe first be calibrated over a two-dimensional grid of angle combinations. The no-null procedure provides the user with the simplest and quickest technique for carrying out an extensive duct traverse, but calibration and final analysis of the data become much more complicated. Accuracy can also be sacrificed when either the yaw angle or pitch angle becomes large.

To avoid the complexities of the no-null calibration and data reduction, a second operational procedure, the single-null method, requires that the probe always be nulled or balanced in the yaw angle. This method allows calibration of only the pitch pressure differential over a range of pitch angles.

The third operational procedure requires nulling or balancing those pressures which indicate the two angles of the velocity vector by rotating the sensing head relative to both axes. This technique, called the double-null procedure, is not a practical alternative in large applications since duct penetrations allow only rotation of the probe to provide determination of the yaw angle.

BRIEF DESCRIPTION OF THE DRAWINGS

FIG. 1 is a perspective view of a prior art type DAT probe.

FIG. 2 is a perspective view of a prior art type DC probe.

FIG. 3 is a front elevational view of a slotted probe which is a first embodiment of the present invention.

FIG. 4 is a side elevational view of the probe of FIG. 3.

FIG. 5 is a plan section view taken along lines 5—5 in FIG. 4.

FIG. 6 is a side elevational view of a beveled probe which is a second embodiment of the present invention.

PRIOR ART

Probe geometries have been described and studied for many years to develop equipment and procedure to evaluate flow characteristics, especially for small models. The following references are the most relevant:

Bryer, D. W., Walshe, D. E., Garner, H. C., "Pressure Probes Selected for Three Dimensional Flow Measurement," Reports and Memoranda No. 3037 of Aerodynamics Division of National Physical Laboratory, London, 1955.

Bryer, D. W., Pankhurst, R. C., "Pressure-Probe Methods for Determining Wind Speed and Flow Direction," National Physical Laboratory, London, 1971.

Winternitz, F. A. L., "Probe Measurements in Three-Dimensional Flow," Aircraft Engineering, pp. 273–278, August 1956.

Treaster, A. L., Yocum, A. M., "The Calibration and Application of Five-Hole Probes," ISA Transactions, Vol. 18, No. 3, 1979.

Treaster, A. L., Houtz, H. E., "Fabricating and Calibrating Five Hole Probes," ASME Fluid Measurements and Instrumentation Forum, FED Volume 34, pp. 1–4. Atlanta, Ga., 1986.

Gerhart, P. M., Nuspl, S. P., Wood, C. O., Lovejoy, S. W., "An Evaluation of Velocity Probes for Measuring Non-Uniform Gas Flow in Large Ducts," Journal of Engineering for Power, Vol. 101, October 1979.

Two examples of commercially available three-component probe geometries are shown in FIGS. 1 and 2.

FIG. 1 depicts the Type DAT probe manufactured by United Sensors. This is an essentially cylindrical probe into which five flat surfaces have been machined. The sensing holes are drilled into these surfaces. Often referred to as a prism probe, the sensing head is characterized by numerous sharp edges where the cylindrical shaft transitions to the flat surfaces. The Type DAT is equipped with a half-shield Type K thermocouple at the end. Prior uses of this probe design have revealed instabilities possibly caused by the sharp edges near the total and static ports.

The Type DC probe shown in FIG. 2 is a curved or gooseneck probe designed to position the conical sensing head nearer to boundaries than the Type DAT will allow. This geometry also reduces the interference caused by the probe support shaft on the sensing head. Rather than machining the sensing ports into a hemispherical tip, such as the standard pitot-static tube, two conic surfaces are prepared. The pitch and yaw ports are drilled at 90° intervals around the surface furthest from the tip. The second surface transitions the first to the flat tip where the total pressure port is positioned. The diameter of the flat tip is approximately twice the size of the total pressure port. The gooseneck arrangement of this configuration is cumbersome to use in actual test ports and more susceptible to damage.

Therefore, it is an object of the present invention to provide improved three-component velocity probes for large scale applications.

DESCRIPTION OF THE PREFERRED EMBODIMENTS

The preferred embodiments of the invention are now described with reference to the drawings.

FIGS. 3, 4 and 5 show views of an embodiment of a three-component cylindrical probe. The probe consists of a cylinder 10 connected to a base 11. The probe has five ports 12–16 which are drilled into the body of the probe and through to the base, ultimately to be connected to the desired measurement equipment.

Two sensing ports 12 and 13 are located on the surface of the cylinder 78.5° apart. Such an arrangement has been previously shown by C. J. Fechheimer in "Measurement of Static Pressure," ASME Annual Meeting Paper No. 2026, New York, 1926. A total pressure port 14 located on the surface of the cylinder between ports 12 and 13, is also provided as described by R. Poole in "Aerodynamics for the Heating & Ventilation Engineer," The Heating & Ventilating Engineer and Journal of Air Conditioning, pp. 455–460, May 1946, wherein he determined that the magnitude & direction of a two-dimensional velocity vector could be measured.

The present invention adds pitch sensing capabilities by providing two slots 25, 26 parallel to the line formed by ports 12–14, one slot on either side of ports 12–14. These slots each form a pair of faces perpendicular to the axis of the cylinder. Pitch sensing ports 15, 16 are provided in each of the slots 20, 21. Each pitch sensing port is located on the perpendicular face closest to ports 12–14 and each port 15, 16 is preferably centered in the face such that they are both on the same radial plane as port 14. Each port is connected by machined passages to a tube or other means for connecting the sensing ports to a measurement device, wherein such connecting means run from the port, through the base and out of the probe.

The passages may be formed, for example, by drilling five individual holes into a solid cylinder to form the ports. These holes continue into the cylinder and meet passages drilled from the support end of the probe and parallel to the axis of the cylinder. At the support end of the probe the five holes are slightly enlarged to allow insertion of a short length of stainless steel tubing. This tubing provides the connection between the internal passages and the flexible tubing that connects to pressure transducer measuring devices.

The probe may be machined from metal or fabricated from acrylic. For example, a one inch acrylic cylinder may be provided with two 3/32 inch static pressure ports 12, 13 and one 3/32 inch total pressure port 14 about four inches from the end 18 of the probe. One-half inch wide right angle slots 25, 26 are milled into the surface of the cylinder, one-quarter inch deep at the center. In this example, each slot has its nearest perpendicular face ⅜ inch from the total and static pressure ports 12–14, and 3/32 inch holes are drilled into the near perpendicular faces to form pitch sensing ports 15, 16. Machined passages 19–23 within the cylinder connect ports 12–16 with the pressure measurements system.

This embodiment has been found to be more accurate than the Type DAT, and more suitable for large scale use. The smooth surfaces reduce the chance for instabilities to occur because of the reduction of sharp edges near the total and static pressure sensing ports.

FIG. 6 shows a second embodiment of the improved probe design. This embodiment is similar to the embodiment in FIGS. 3–5, except that beveled slots 30, 31 are used instead of the right angle slots 25, 26. Each beveled slot is characterized by a perpendicular face in each slot facing away from ports 12–14, and a sloping surface angled from the bottom of the perpendicular face upward and away from the ports 12–14. Pitch sensing ports 15, 16 are centered in the perpendicular faces. This modification removes half of the sharp edges of the first embodiment, thereby further smoothing the flow near the sensing ports and reducing the chance for damage to the probe caused by snagging the probe on the duct access ports. In a slight modification of this embodiment, the beveled surfaces could be placed closest to the ports 12–14, thereby making the transition back to the cylinder smoother than if the square edges were placed closest to the ports. This arrangement, however, increases the separation of the pitch sensing ports 15, 16.

While the invention has been described in detail with particular reference to the preferred embodiments thereof, it will be understood that variations and modifications can be effected within the spirit and scope of the invention as previously described and as defined by the claims.

What is claimed is:

1. A three-component gas flow velocity probe, which comprises:
a cylinder having three equally spaced sensing ports located on the cylindrical surface in a plane perpendicular to the axis of said cylinder; and two recesses in said cylinder transverse of the length of said cylinder, said two recesses on opposite sides of said three sensing ports and equally spaced from said three sensing ports, each such recess having a single pitch sensing port located therein such that said two pitch sensing ports lie in the same radial plane as the center one of said three equally spaced sensing ports, said cylinder having a support end and a distal end; and
means for connecting each of said five sensing ports individually in gas flow relationship to desired pressure sensing means remote from said probe, which such connecting means are internal to said cylinder and exit said cylinder at its support end.

2. The velocity probe of claim 1 wherein said connecting means comprise five machined passages, one end of each passage terminating at one of each of said five sensing ports.

3. The velocity probe of claim 1 wherein each of said two recesses comprise a slot in said cylinder having two parallel opposing walls perpendicular to the axis of said cylinder with a planar surface therebetween forming right angles with said walls; and
wherein said pitch sensing ports are in the walls of said slots closest to said three equally spaced sensing ports.

4. The velocity probe of claim 3 wherein the two outer ports of said three qually spaced ports form an angle of 78.5°.

5. The velocity probe of claim 3 wherein said three equally spaced ports are at least four cylinder diameters from the distal end of said cylinder, said slots are at least one-half cylinder diameter wide and one-quarter cylinder diameter deep at the center of said slots, and wherein said pitch ports are between one-half and one cylinder diameter from said three equally spaced sensing ports.

6. The velocity probe of claim 5 wherein the diameter of the probe is at least one inch and said three equally spaced ports have a diameter of at least 3/32 inch and said pitch sensing ports have a diameter of at least 3/32 inch.

7. The velocity probe of claim 1 wherein each of said two recesses comprise a face perpendicular to the axis of said cylinder facing said three equally spaced sensing ports and a beveled planar surface angled toward said three equally spaced sensing ports from the bottom of said perpendicular face to the surface of said cylinder;
wherein said pitch sensing ports are in said perpendicular faces.

8. The velocity probe of claim 7 wherein the two outer ports of said three equally spaced ports form an angle of 78.5°.

9. The velocity probe of claim 7 wherein said three equally spaced ports are at least four cylinder diameters from the distal end of said cylinder, said slots are at least one half cylinder diameter wide and one-quarter cylinder diameter deep at the center of said slots, and wherein said pitch ports are between one-half and one cylinder diameter from said three equally spaced sensing ports.

10. The velocity probe of claim 9 wherein the diameter of the probe is at least one inch and said three equally spaced ports have a diameter of at least 3/32 inch and said pitch sensing ports have a diameter of at least 3/32 inch.

* * * * *